June 23, 1970    R. G. PIGGOTT    3,516,638
FLOW DIVERTER BALL VALVE
Filed Oct. 31, 1968
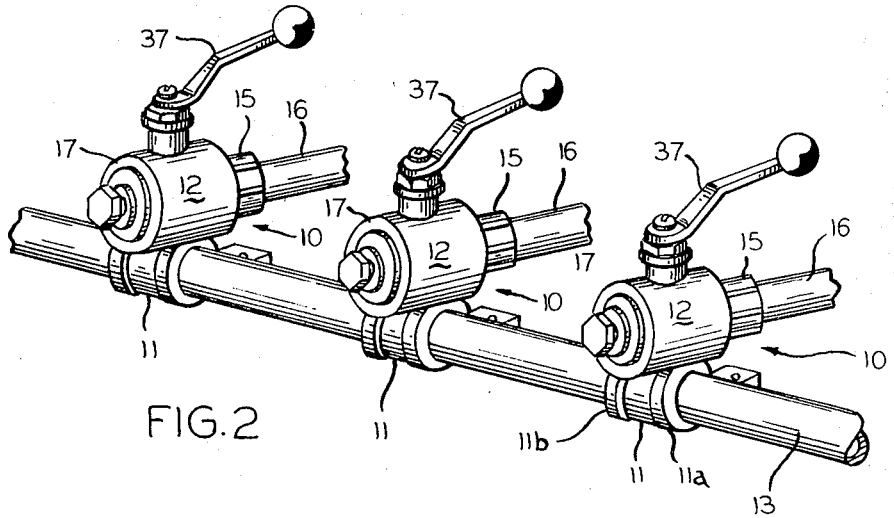
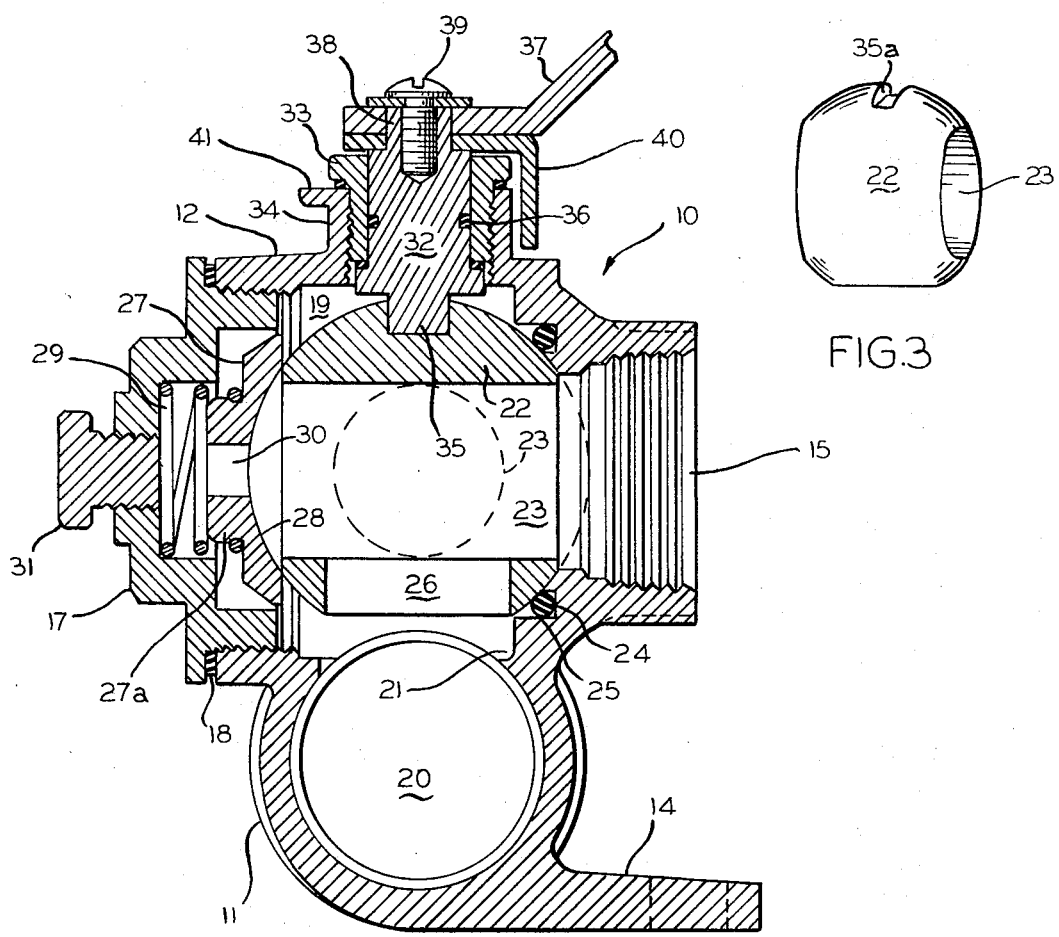
INVENTOR
RICHARD G. PIGGOTT
BY
Mann, Brown & McWilliams
ATTORNEYS United States Patent Office 3,516,638
Patented June 23, 1970

3,516,638
FLOW DIVERTER BALL VALVE
Richard G. Piggott, Bellwood, Ill., assignor to Spraying Systems Co., a corporation of Illinois
Filed Oct. 31, 1968, Ser. No. 772,233
Int. Cl. F16k 5/20
U.S. Cl. 251—175       9 Claims

ABSTRACT OF THE DISCLOSURE

A flow diverting valve with ball operator and formed to allow selective diversion of flow from a main conduit line without shutting off the flow through the line. The valve body is formed so that all of the operating parts of the valve may easily be removed and replaced without taking the valve body out of the main piping line.

---

The present invention is directed to new and useful improvements in ball type valves.

The major purposes of the present invention are to form a ball valve in such a manner that relatively large flow passages through the valve are easily opened and closed, to so form a valve that all of the operating parts of the valve may be quickly and easily disassembled for cleaning and/or repair without disturbing the piping connections with the main valve body, and to so form a ball type valve that sealing means for the valve are effective to prevent leakage from the valve at both high and low pressure conditions, these and other purposes being more apparent in the course of the ensuing specification and claims, when taken with the accompanying drawings, in which:

FIG. 1 is a sectional view of a typical valve body assembly incorporating the principles of the present invention;

FIG. 2 is a schematic showing of valves incorporating the principles of the present invention installed in a typical pressure supply line; and FIG. 3 is a perspective view of a ball operator utilized in the invention as illustrated in FIGS. 1 and 2.

Like elements are designated by like characters throughout the specification and drawings.

With specific reference now to the drawings, and in the first instance to FIG. 1, the numeral 10 generally designates a valve body which is shaped as a first generally cylindrical portion 11 and a second generally cylindrical portion 12 positioned at one side of cylindrical portion 11 while extending generally at right angles thereto. Cylindrical portion 11 has piping connections 11a and 11b as indicated in FIG. 2 for connection in a main conduit line 13. While a plurality of valves are illustrated in FIG. 2, it should be understood that the present invention is directed to a single valve, although it may be embodied in a plurality of similar valves in the same line. Cylindrical portion 11 may be extended to one side as indicated at 14 so as to define a mounting bracket if desired.

Cylindrical portion 12 of the valve body is reduced at one side thereof so as to define an internally threaded outlet opening 15. Outlet opening 15 may be connected to a suitable branch line as indicated at 16 in FIG. 2. The other side of the cylindrical portion 12 is adapted to be closed by a cap 17 which is threaded into that end of the cylindrical portion. A gasket 18 may extend around the end wall of the cylindrical portion 12 and be engaged by an overlying portion of cap 17 so as to seal that side of the cylindrical portion.

The interior of cylindrical portion 12 of the valve body defines an operating chamber 19. Operating chamber 19 is in communication with the flow passage 20 through cylindrical portion 11 as by means of an opening 21 between the passage 20 and the chamber. The opening between the passage 20 and the chamber 19 may be established simply by molding the chamber 19 as a cylindrical bore in a portion 12 in intersecting relation with the side of the passage 20 in cylindrical portion 11.

In order to selectively open and close the valve so as to selectively establish and disestablish communication through outlet 15 from main flow passage 20, a ball 22 is swivelly mounted in the chamber 19. Ball 22 has a first passage 23 extending therethrough from one side to the other and adapted for selective alignment with outlet passage 15 and a position at right angles thereto as may be appreciated from the perspective view of the ball operator in FIG. 3. One side of the ball 22 is supported by a sealing O-ring 24 which defines a valve seat extending around the outlet passage. This seal ring is positioned in an annular groove 25 which is formed in the valve body and which extends around the outlet 15. Ball 22 has a second passage 26 intersecting the first passage 23 at right angles thereto and opposed to the opening 21 from main flow passage 20.

In order to support the other side of the ball, a ball support 27 has a surface 28 which is partially spherical and formed on a radius generally equal to the radius of the ball. Ball support 27 is positioned generally within the confines of a bore in the end cap 17. A spring 29 extends between the end cap and the ball support and urges the ball support against the ball in a supporting relation while allowing turning movement of the ball. Spring 29 is supported in a recess in end cap 17 and surrounds a boss 27a to give support to the spring of the ball support 27. Ball support 27 has a passage 30 formed therein and adapted for alignment with the main flow passage 23 through the ball when flow passage 23 is aligned with outlet 15. This allows communication of the pressure within passage 23 to the side of the ball support not engaged with the ball. This provides a larger pressure area on the ball support than the pressure area opposed to the pressure within flow passage 23. This differential pressure aids spring 29 in urging the ball support towards the ball and the ball against the valve seat defined by the O-ring 24. Thus, as the pressure is increased, the sealing forces against O-ring 24 are increased.

End cap 17 may have a plug 31 threaded into the end face thereof so as to allow removal of the plug and selective use of a pressure gauge as by threading a connection from the gauge into the threaded opening which carries the plug.

In order to rotate the ball operator 22, an operating stem 32 is rotatably mounted within a stem retainer 33 which in turn is threaded into an opening in a boss 34 positioned at one side of cylindrical portion 12 opposite to cylindrical portion 11. Boss 34 is axially aligned with the center of the ball 22 and opening 21. Stem 32 has a tang 35 which is removably and slidably received within a groove in the ball. The tang 35 and groove 35a have matching, generally rectangular cross-sectional shapes and extend linearly. Tang 35 and the groove in the ball extend at right angles to the axis of the outlet passage in the open position of the valve illustrated in full lines in FIG. 2.

It should be noted that the operating tang of the operating stem and the groove in which the tang is received extends generally perpendicular to the direction of flow through the outlet from the valve when the valve is in the open position, and extends generally parallel to the axis of the outlet when the ball operator is in the closed position as indicated by the dotted lines in the drawings. Some tolerance is maintained between the tang and the groove in which the tang is seated so that the pressure forces to the left of the ball retainer in FIG. 2 nonetheless may force the ball toward the valve seal around the outlet. When the valve is turned to the closed position wherein the passage through the ball is disposed perpendicular to the axis of the outlet, and the surface of the ball closes the outlet, the groove and tang construction is disposed parallel to the axis of the outlet also and the connection offers little resistance to movement of the ball toward the valve seat under influence of the spring and fluid pressure.

The valve stem may have an O-ring 36 carried on the wall thereof so as to seal the stem within the retainer 33.

In order to rotate stem 32 a handle 37 is fitted over a splined exposed end portion 38 of the stem which allows selective positioning of the handle at various angular positions relative to the stem. A screw 39 may be employed to hold the handle on the operating stem. A stop element 40 may be removably carried by the handle for engagement with a lug portion 41 on boss 34 so as to limit rotation of the stem and the ball 22 to 90°.

It should be noted that the flow passages within the ball are relatively large so as to provide substantially the same flow area as the flow area through the main passage 20 so as to allow a large capacity output through the valve. It should also be noted that by virtue of the structural arrangement of the valve, end cap 17 may be removed and when the operating stem turns the ball 22 to a position wherein the passage 23 extends at right angles to the outlet 15, as in the closed position, all interior operating parts with the exception of the stem 32 may be removed through the end opening normally filled by the end cap 17. This allows the interior parts of the valve to be replaced, cleaned or repaired without taking the valve body out of the main conduit line. The operating parts of the valve may then be quickly reassembled simply by inserting the ball so that the tang 35 is slidably engaged with the groove in the ball. By threading the cap, with the ball support in position, into the cylindrical portion 12, the ball is moved into its operating position wherein it engages the O-ring 24. By reason of the spring 29, the ball is positively urged against the valve seat at all conditions of pressure in passage 20. As the pressure increases, the fluid pressure acting on the area of the ball support 27 forces the ball even more tightly against the O-ring seal 24.

The structural arrangement of the valve is such that relatively low operating forces are required to turn the ball operator from the closed to the open position and vice versa.

Whereas I have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

I claim:

1. A valve for diverting flow from a main flow conduit while allowing shut-off of the valve without disturbing the main flow in the conduit including a valve body having a cylindrical passage formed therethrough with fittings adapted for connection to a conduit line, said valve body having a chamber positioned at one side of the cylindrical passage and an opening between said cylindrical passage and said chamber, said valve body having an outlet formed therethrough and leading into said chamber, a ball in said chamber for selectively opening and closing flow from said cylindrical passage through said outlet, said ball having a first passage extending therethrough and adapted for alignment with said outlet, said ball having a second passage intersecting said first named passage and opposed to the opening from said cylindrical passage, and means mounting said ball for rotation in said chamber including an annular valve seat in said chamber and formed around said outlet, a partially spherical ball support engaged with said ball at a side of said ball opposite to said valve seat, means for urging said ball support into engagement with said ball while urging said ball into engagement with said valve seat, and an operating stem rotatably mounted in said valve body and operatively connected with said ball for rotating said ball to thereby selectively move said first named ball passage into and out of communicating alignment with said outlet from said valve body.

2. The structure of claim 1 wherein said means for urging said ball support into engagement with said ball includes a spring and fluid pressure means.

3. The structure of claim 1 wherein said ball support has a flow passage formed therethrough and alignable with the first named passage in said ball when said first named passage is aligned with said outlet, said body including a fluid space positioned on the side of said ball support opposite to said ball whereby the fluid pressure may bias said ball support and said ball toward said valve seat.

4. The structure of claim 1 characterized by and including an operating handle for said stem and having a splined connection with said stem.

5. The structure of claim 1 characterized by and including stop means for limiting rotation of said operating stem.

6. The structure of claim 1 wherein said chamber is defined by a generally cylindrical bore formed in said valve body and aligned with said outlet, said valve seat is formed at a reduced portion of said bore around said outlet, and an end cap closes one side of said bore opposite to the outlet, said ball support being held in position by said end cap.

7. The structure of claim 1 wherein said valve body is shaped to define a generally cylindrical bore extending around said ball support and ball to define said chamber, and a cap is removably connected over said bore.

8. The structure of claim 7 wherein the diameter of said circular portion is at least as great as the diameter of said ball so that upon removal of said cap, said ball and ball support may be removed through the bore.

9. The structure of claim 8 wherein said stem is detachably connected to said ball by a tang received in an elongated groove in the surface of said ball, said tang and groove have matching cross-sections, and said groove and tang extend parallel to the axis of said cylindrical bore.

References Cited

UNITED STATES PATENTS

| | | | |
|---|---|---|---|
| 1,670,691 | 5/1928 | Riggin | 251—315 |
| 2,185,061 | 12/1939 | Meyers | 137—637.1 |
| 2,930,575 | 3/1960 | Britton | 251—315 X |
| 3,308,850 | 3/1967 | Gill | 251—315 X |

CLARENCE R. GORDON, Primary Examiner

U.S. Cl. X.R.

137—608; 251—183, 185, 310, 315